United States Patent
Fortmann

(10) Patent No.: US 10,461,536 B2
(45) Date of Patent: Oct. 29, 2019

(54) WIND FARM AND METHOD FOR OPERATING A WIND FARM

(75) Inventor: Jens Fortmann, Berlin (DE)

(73) Assignee: SENVION SE, Hamburg (DE)

( * ) Notice: Subject to any disclaimer, the term of this patent is extended or adjusted under 35 U.S.C. 154(b) by 892 days.

(21) Appl. No.: 13/824,262

(22) PCT Filed: Dec. 23, 2011

(86) PCT No.: PCT/EP2011/073981
§ 371 (c)(1),
(2), (4) Date: Mar. 15, 2013

(87) PCT Pub. No.: WO2012/089675
PCT Pub. Date: Jul. 5, 2012

(65) Prior Publication Data
US 2013/0175870 A1 Jul. 11, 2013

(30) Foreign Application Priority Data
Dec. 29, 2010 (DE) .................. 10 2010 056 456

(51) Int. Cl.
*H02J 3/18* (2006.01)
*F03D 9/25* (2016.01)
*H02J 3/16* (2006.01)

(52) U.S. Cl.
CPC .............. *H02J 3/18* (2013.01); *F03D 9/257* (2017.02); *F05B 2270/337* (2013.01); *H02J 3/16* (2013.01);
(Continued)

(58) Field of Classification Search
None
See application file for complete search history.

(56) References Cited

U.S. PATENT DOCUMENTS

2005/0046196 A1* 3/2005 Larsen ..................... 290/44
2008/0073912 A1 3/2008 Fortmann et al.
(Continued)

FOREIGN PATENT DOCUMENTS

DE 10 2004 048 339 4/2006
DE 10 2004 048 341 4/2006
(Continued)

OTHER PUBLICATIONS

Fortmann et al., "A Novel Centralised Wind Farm Controller Utilising Voltage Control Capability of Wind Turbines," *16th PSCC*, Jul. 14-18, 2008, Glasgow, Scotland ; pp. 1-7.
(Continued)

*Primary Examiner* — Sean Shechtman
(74) *Attorney, Agent, or Firm* — Morrison & Foerster LLP

(57) ABSTRACT

Operating a wind farm in which the power generated by the wind energy installations is fed to a power supply system via a system internal to the wind farm and via a substation is disclosed. The farm director of the wind farm can ascertain a standard target voltage value and transmit it to the control units of the individual wind energy installations on the wind farm, which can use an overall factor to regulate the reactive power generated by a wind energy installation. The overall factor can be calculated from the difference between the actual voltage across the wind energy installation and the target voltage value, multiplied by a gain factor. On account of the impedance in the internal system of the wind farm, wind energy installations situated far away from the substation thus generate less reactive power than the wind energy installations which are situated close to the substation.

16 Claims, 2 Drawing Sheets

(52) U.S. Cl.
CPC ............... *Y02E 10/72* (2013.01); *Y02E 40/34* (2013.01); *Y10T 307/718* (2015.04)

(56) References Cited

U.S. PATENT DOCUMENTS

| | | | |
|---|---|---|---|
| 2009/0096211 A1* | 4/2009 | Stiesdal | H02J 3/1835 290/44 |
| 2010/0207463 A1 | 8/2010 | Fortmann et al. | |
| 2010/0268393 A1 | 10/2010 | Fischle et al. | |
| 2010/0312409 A1 | 12/2010 | Zeumer et al. | |

FOREIGN PATENT DOCUMENTS

| | | |
|---|---|---|
| DE | 10 2007 017 870 | 10/2008 |
| DE | 10 2007 044 601 | 4/2009 |
| DE | 10 2008 048 258 | 4/2010 |
| DE | 10 2009 037 523 | 10/2010 |
| DE | 10 2009 017 939 | 11/2010 |
| EP | 1 512 869 | 3/2005 |
| EP | 2 108 828 | 10/2009 |

OTHER PUBLICATIONS

International Search Report dated Jul. 31, 2012, directed to International Application No. PCT/EP2011/073981; 5 pages.

International Preliminary Report on Patentability dated Jul. 2, 2013, directed to International Application No. PCT/EP2011/073981; 7 pages.

* cited by examiner

WIND FARM AND METHOD FOR OPERATING A WIND FARM

REFERENCE TO RELATED APPLICATIONS

This application is a national stage application under 35 USC 371 of International Application No. PCT/EP2011/073981, filed Dec. 23, 2011, which claims the priority of German Application No. 10 2010 056 456.7, filed Dec. 29, 2010, the entire contents of which are incorporated herein by reference.

FIELD OF THE INVENTION

The invention relates to a method for operating a wind farm, and also to a wind farm.

BACKGROUND OF THE INVENTION

On wind farms, the power that is generated by a plurality of wind energy installations is fed into an internal wind farm network. The power that is fed into the internal wind farm network is fed into a power supply network at a substation after undergoing transformation as required. In order to maintain the quality of the power supply in the power supply network, the power that is fed into the power supply network by the wind farm must meet certain specifications, for example, with respect to the power factor, that is, the ratio between the real power and the reactive power. This is monitored by a farm control system known as a "farm master," which is able to influence individual control devices of the wind energy installations in such a way that the sum of the power generated by the wind energy installations fulfills the requirements resulting from the power supply network.

The real power generated on a wind farm cannot be freely determined by the farm master, but rather is dependent on the wind speed and the design output of the individual wind energy installations. However, the farm master can be used to determine the amount of reactive power generated by the wind farm.

Power losses occur in the lines of the internal wind farm network. These losses can be reduced by varying the reactive power. Prior art describes measures for doing this, some of which work in contrary directions.

For example, if the wind energy installations are at a standstill, but there is a requirement for reactive power, passive components can be used to meet the reactive power requirement, instead of the converters in the wind energy installations, which are subject to operating losses.

Furthermore, at times when the wind energy installations are operating at high capacity, it is possible to select the maximum possible voltage in the internal wind farm network at the substation. This results in a reduction of the losses in the cables in the internal wind farm network. This is particularly advisable when the wind energy installations are operating at high capacity, since cable losses dominate in this case. In contrast, when the wind energy installations are operating at low capacity, the minimum possible voltage should be selected in the internal wind farm network, since transformer losses dominate in this case. These losses can be reduced by selecting a low voltage in the internal wind farm network. DE 10 2008 048 258 A1 describes a method for changing the voltage in the internal wind farm network depending on the amount of power generated by the wind energy installations.

Furthermore, it is possible to minimize the distance over which the power in the internal wind farm network must be transported. This allows the distance over which the reactive power must be transported to be minimized, thus reducing cable losses. However, the potential for reducing losses in the internal wind farm network in this way is limited.

European patent application EP 2 108 828 A2 describes a process for operating a wind farm in which a farm control system is designed such that the reactive power required to meet the requirements of the power supply network is generated primarily in the wind energy installations that are near the node, whereas the wind energy installations that are more distant make a smaller contribution to the generation of reactive power. This ensures that a large portion of the reactive power must only be transported over a short distance between the wind energy installation and the node in the internal wind farm network, and that a smaller portion of the reactive power must be transported over a longer transport route. Overall, there is a reduction of loss due to reactive power transport in the internal wind farm network. According to this prior art, the farm control system transmits individual target values for real and reactive power to every wind energy installation. The farm control system must therefore be designed to be able to solve a complex system of equations. Solving the system of equations takes considerable time, causing a delay in the adjustment of the real and reactive power generated on the wind farm when changes occur in the power supply network. During this delay, it cannot be ensured that the power that is fed into the power supply network by the wind farm meets the requirements of the power supply network.

SUMMARY OF THE INVENTION

An object of the current invention is to create a method for operating a wind farm, as well as a wind farm, in which the losses in the internal wind farm network due to reactive power are reduced, and the real and reactive power of the wind farm can be quickly adjusted.

This object is achieved through the method for operating a wind farm and a wind farm as broadly described herein. Advantageous developments arise from the detailed embodiments described below.

The invention thus relates to a method for operating a wind farm having a plurality of wind energy installations, each having a control unit, which are connected to an internal wind farm network, a substation at which electrical power that is generated on the wind farm is delivered by the internal wind farm network to a power supply network, and a farm master that is connected to the control units of the individual wind energy installations, wherein the farm master determines a uniform target voltage value (Utarget) and transmits the target voltage value (Utarget) to the control units of the individual wind energy installations, and the reactive power that is generated by a wind energy installation is adjusted via the control unit of the wind energy installation by an overall factor (Ib), wherein the overall factor (Ib) comprises a first factor (Ib1) that is calculated from the difference between the actual voltage (Uactual) present at the wind energy installation and the target voltage value (Utarget), multiplied by a gain factor (k_Ib).

Furthermore, the invention relates to a wind farm having a plurality of wind energy installations, each having a control unit, which are connected to an internal wind farm network, a substation at which the electrical power that is generated on the wind farm is delivered by the internal wind farm network to a power supply network, and a farm master that is connected to the control units of the wind energy installations, wherein the farm master is configured to determine a uniform target voltage value (Utarget) and to transmit the target voltage value (Utarget) to the control units of the individual wind energy installations, and the reactive power that is generated by a wind energy installation can be adjusted via the control unit of the wind energy installation by an overall factor (Ib), wherein the overall factor (Ib) comprises a first factor (Ib1) that can be calculated from the difference between the actual voltage (Uactual) present at the wind energy installation and the target voltage value (Utarget), multiplied by a gain factor (k_Ib).

The invention is based on the knowledge that controlling reactive power by means of a target voltage results in an optimization of the reactive power distribution on the wind farm due to impedance in the internal wind farm network. The wind energy installations receive a uniform value for the target voltage, so that it is not necessary to perform a complex calculation of individual target values. Instantaneous reactive power control is thus possible.

If, for example, a capacitive (overexcited) feed-in of reactive power should occur, the farm master sets the target voltage value to a somewhat higher level than the voltage value measured at the substation. This determined value is transmitted to the control units of the wind energy installations. There, the factor Ib1 is calculated from the difference of the actual voltage Uactual present at each wind energy installation and the target voltage value Utarget, multiplied by a gain factor kIb:

$$Ib_1 = (U_{actual} - U_{target}) \times k_{Ib}$$

The factor Ib1 is incorporated into the overall factor Ib, the following being true in the simplest case:

$$Ib = Ib_1$$

Based on the overall factor Ib, the control unit can adjust the reactive power generation of the wind energy installation, with a higher overall factor Ib resulting in a higher level of reactive power generation.

As a consequence of the impedance in the internal wind farm network, different actual voltages arise at the individual wind energy installations. The voltages at wind energy installations near the substation are lower than at wind energy installations located farther away from the substation. By basing the generation of reactive power at each wind energy installation on the difference between the uniform target voltage value and the respective actual voltages, the wind energy installations near the substation can feed in more reactive power into the internal wind farm network than the wind energy installations located farther away from the substation.

According to the invention, if the wind energy installations that are arranged more closely to the substation feed a higher portion of reactive power into the internal wind farm network than wind energy installations that are located farther away from the substation, the higher portion of reactive power only has to be transported over a shorter distance within the internal wind farm network. In this way, the transport losses are reduced relative to a wind farm in which the reactive power generation is equally distributed across all wind energy installations. Unlike in prior art, the invention does not require a complex farm master to calculate reactive power target values for each individual wind energy installation. In fact, according to the invention, it is sufficient merely to specify a reactive power target value in the form of a uniform target voltage value that is transmitted to all wind energy installations. The reactive power control thus takes place practically instantaneously. By utilizing effects according to the invention in the internal wind farm network, a loss-optimized distribution of the generated reactive power to the individual wind energy installations on the wind farm is achieved.

To avoid corrections being made too rapidly when changes occur in the power supply network, another factor Ib2 can be incorporated into the overall factor Ib, in addition to the factor Ib1. The factors Ib1 and Ib2 can preferably be added to the overall factor Ib:

$$Ib = Ib_1 + Ib_2$$

Whereas the factor Ib1 can be determined as described above, the factor Ib2 can preferably be calculated from the difference between the actual voltage present at the wind energy installation averaged over a specified period of time Uactual; averaged and the target voltage value Utarget, multiplied by a gain factor kIb:

$$Ib_2 = (U_{actual;\ averaged} - U_{target}) \times k_{Ib}$$

This factor Ib2 can be used to ensure that if a network fault or a similar event occurs, a portion of the generated reactive power is instantaneously adjusted to the new circumstances (via the factor Ib1), whereas another portion is adjusted with a certain delay (via the factor Ib2). In this way, it is possible to avoid unnecessary oscillation excitement in the internal wind farm network and/or power supply network.

Alternatively, it is possible to use the difference between the actual voltage Uactual and the target voltage value Utarget, rather than the actual voltage Uactual present at the wind energy installation, for determining the factor Ib2. In this case, the factor Ib2 is calculated from the difference averaged over a specified period of time between the actual voltage Uactual present at the wind energy installation and the target voltage value Utarget, multiplied by a gain factor kIb:

$$Ib_2 = (U_{actual} - U_{target})_{averaged} \times k_{Ib}$$

Alternatively, it is possible to use a time average of the target voltage Utarget to obtain the factor Ib2. In such a case, the factor Ib2 is thus calculated from the difference between the actual voltage Uactual present at the wind energy installation and the target voltage value averaged over a specified period of time Utarget, multiplied by a gain factor kIb:

$$Ib_2 = (U_{actual} - U_{target;\ averaged}) \times k_{Ib}$$

It is also possible to calculate the factor Ib2 from a time average of the factor Ib1:

$$Ib_2 = Ib_{1;\ averaged}$$

It is preferred if the gain factor kIb is determined from a global gain factor kIb; global and a gain factor that can be individually specified for each wind energy installation kIb; WEI:

$$kIb = k_{Ib;\ glaobal} + k_{Ib;\ WEI}$$

The individual factor kIb; WEI can be used to take into account characteristics of the individual wind energy installations and/or the topography of the wind farm when generating reactive power. The factor kIb; WEI can be stored manually in the control unit of each wind energy installation. It is also possible for the farm master to determine the factor kIb; WEI for each wind energy installation and then transmit it to the individual control units. However, since the factor kIb; WEI is not a value that would have to be calculated in real time, the farm master does not have to have unusually high computing power.

Alternatively or additionally, it is possible for the control unit to add an adjustment factor deltaUtarget; WEI to the global target voltage value Utarget, in which case the adjusted target voltage value Utarget' thus calculated is used to calculate the factors kIb1 and kIb2, instead of the target value Utarget. The adjusted target voltage value Utarget' is calculated as follows:

$$U'_{target} = U_{target} + \Delta U_{target, WEI}$$

The adjustment factor deltaUtarget; WEI can be determined by the farm master. However, since this is not a value that would have to be calculated in real time, the farm master does not have to have unusually high computing power.

It is preferred if a plurality of wind energy installations on the wind farm is combined into groups, wherein the wind energy installations in a group are operated using identical values for kIb; WEI and/or deltaUtarget; WEI. In this way, it is possible to reduce the computing effort required for calculating the aforementioned factors.

The wind farm according to the invention is configured to carry out the method according to the invention. In describing the wind farm, reference will be made to the above embodiments of the method according to the invention.

BRIEF DESCRIPTION OF THE DRAWINGS

The invention will now be described using advantageous embodiments as examples and making reference to the drawings. The following are shown.

DETAILED DESCRIPTION OF THE INVENTION

Figure 1:
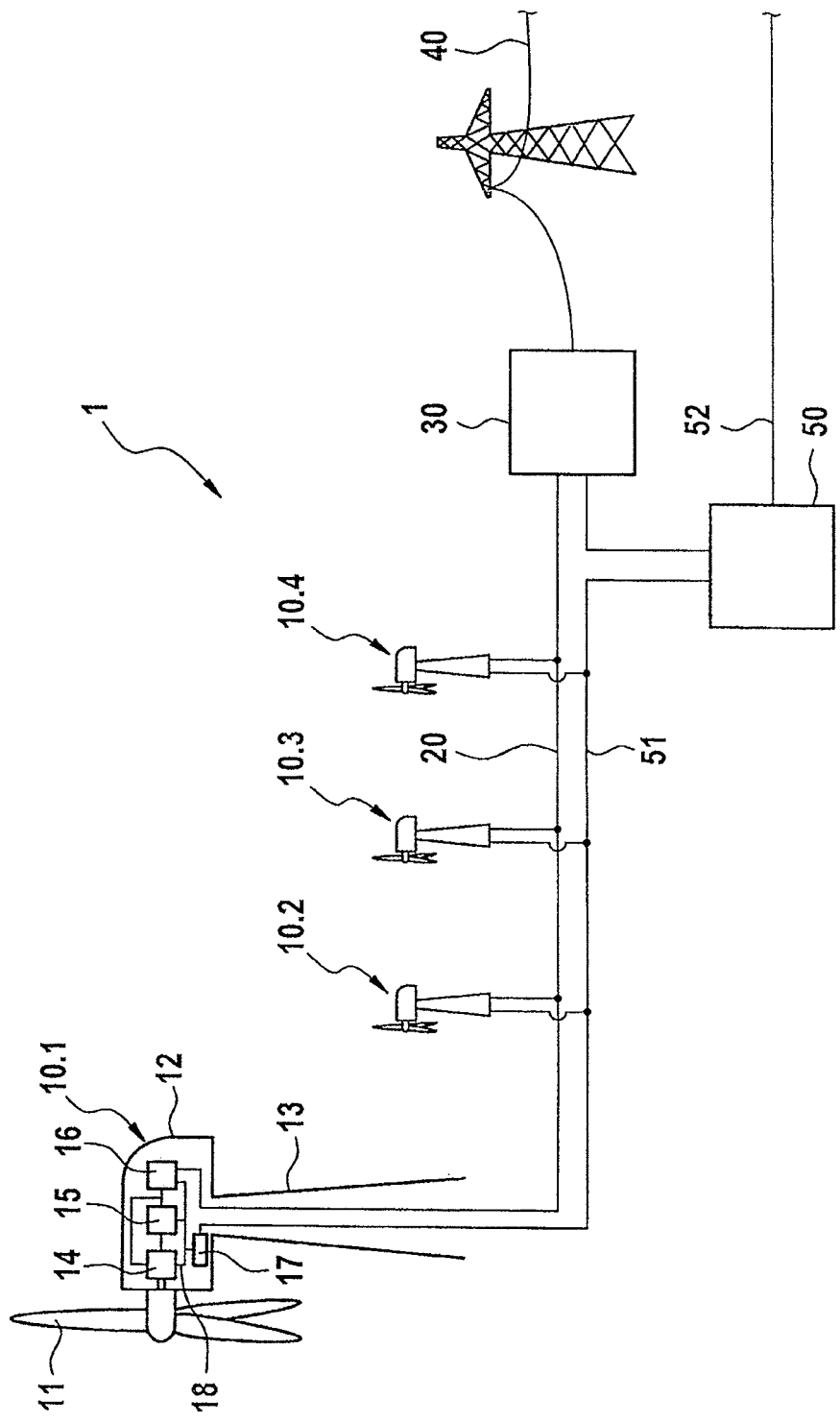
FIG. 1: An embodiment of a wind farm according to the invention.

FIG. 1 shows a representation of a wind farm 1 according to the invention that is operated using the method according to the invention.

The wind farm 1 comprises a plurality of wind energy installations 10.1-10.4, of which the wind energy installation 10.1 is represented in greater detail as an example. A wind energy installation 10 comprises a rotor 11 that is rotatably arranged on a nacelle 12 at the top of a tower 13. The rotor 11 drives a generator 14, which can be a doubly fed asynchronous generator having a stator and a rotor. A converter 15 is connected to the rotor of the generator 14. In addition, a transformer 16 is provided, which transforms the voltage output by the converter 15 and the stator of the generator 14. The operation of the wind energy installation 10 is controlled by a control device 17, which acts on the individual components of the wind energy installation 10 via control lines 18. In addition to the illustrated components, the wind energy installation 10 can of course comprise additional components, such as a pitch adjustment system for the rotor blades or positioning motors with which the nacelle 12 can be pivoted relative to the tower 13.

The wind energy installation 10 is connected to an internal wind farm network 20 in such a way that the power generated by the wind energy installation 10 is fed into the internal wind farm network 20. A substation 30 is likewise connected to the internal wind farm network 20. The electrical power generated by the wind energy installations 10 is delivered by the internal wind farm network 20 to an external power supply network 40 at this substation 30. The internal wind farm network 20 is a medium-voltage network, whereas the power supply network 40 can be a high-voltage network. The substation 40 includes a transformer (not shown) for feeding the power from the internal wind farm network into the power supply network.

A farm master 50 is also provided, which is connected via control lines 51 to the substation 30 and the control units 17 of the individual wind energy installations 10.

In order to be able to feed in the electrical power generated by the wind energy installations 10 into the power supply network 40, it must meet certain requirements. One of these requirements particularly concerns the power factor, that is, the ratio between real and reactive power. Whereas the real power depends practically entirely on the wind that sets the rotors 11 of the wind energy installations 10 in motion, the generated reactive power can be actively controlled, making it possible to maintain the desired power factor. Every wind energy installation 10 on a wind farm does not have to meet these requirements. In fact, it is sufficient if the power that is delivered to the substation 30 by the internal wind farm network 20 meets the requirements of the power supply network 40.

The farm master 50 is configured to determine target values for the reactive power in order to deliver the desired amount of reactive power to the substation 30. The target values for the reactive power can be determined via the power supply network 40 by means of information obtained at the substation 30. In particular, this can be the complex power or the voltage in the power supply network 40. The values obtained at the substation 30 are transmitted via the control lines 51 to the farm master 50, which uses them to determine the target values for the reactive power. When determining the target values for the reactive power, received target values can also be taken into account via an external data line 52. The operator of the power supply network 40 is thus able to specify a reactive power level to be generated by the wind farm 1.

The target values for the reactive power are converted by the farm master 50 into a uniform target voltage value Utarget and transmitted via the control lines 51 to the control devices 17 of the individual wind energy installations 10. The control devices 17 are configured to take into account the received target voltage value Utarget when controlling the wind energy installation with respect to the generation of reactive power. By causing the wind energy installations also to feed reactive power according to the received target voltage value Utarget into the internal wind farm network 20 in addition to the real power, it is ensured that the desired reactive power is delivered to the substation 30.

Every control unit 17 of a wind energy installation 10 is configured such that it determines an overall factor Ib from the uniform target voltage value Utarget and the actual voltage Uactual of the internal wind farm network 20 that is present at the wind energy installation 10, which is used as a basis for the generation of reactive power by the wind energy installation 10.

Impedance causes an unequal voltage distribution in the internal wind farm network 20. The voltage in the internal wind farm network at the wind energy installation 10.1 that is located far away from the substation 30 is thus higher than at the wind energy installation 10.4 that is located close to the substation 30. By also taking into account the actual voltage in the internal wind farm network 20 in addition to the target voltage when determining the overall factor Ib, it can be ensured that less reactive power is fed into the internal wind farm network by the wind energy installation 10.1 that is located far away from the substation 30 than by the wind energy installation 10.4 that is located close to the substation 30. By transporting a greater portion of reactive power over a short distance to the substation 30 and a smaller portion over a longer distance, there is a lower level of loss relative to a wind farm in which the reactive power from all wind energy installations is generated at the same level.

FIGS. 2a-e show schematic representations of various options for determining the overall factor Ib via a control unit 17. FIGS. 2a-e show only the portion of the control unit 17 that is relevant to the invention for determining the overall factor Ib. The transformation of the overall factor Ib into control signals for the components 11-16 of the wind energy installation 10, so that the desired reactive power generation takes place, is not shown. In all examples, the target voltage value Utarget that is determined by the farm master 50 and the actual voltage Uactual that is present at the wind energy installation 10 are provided to the control unit 17 as input values. In all examples according to FIGS. 2a-e, the output value is the overall factor Ib.

Figure 2:
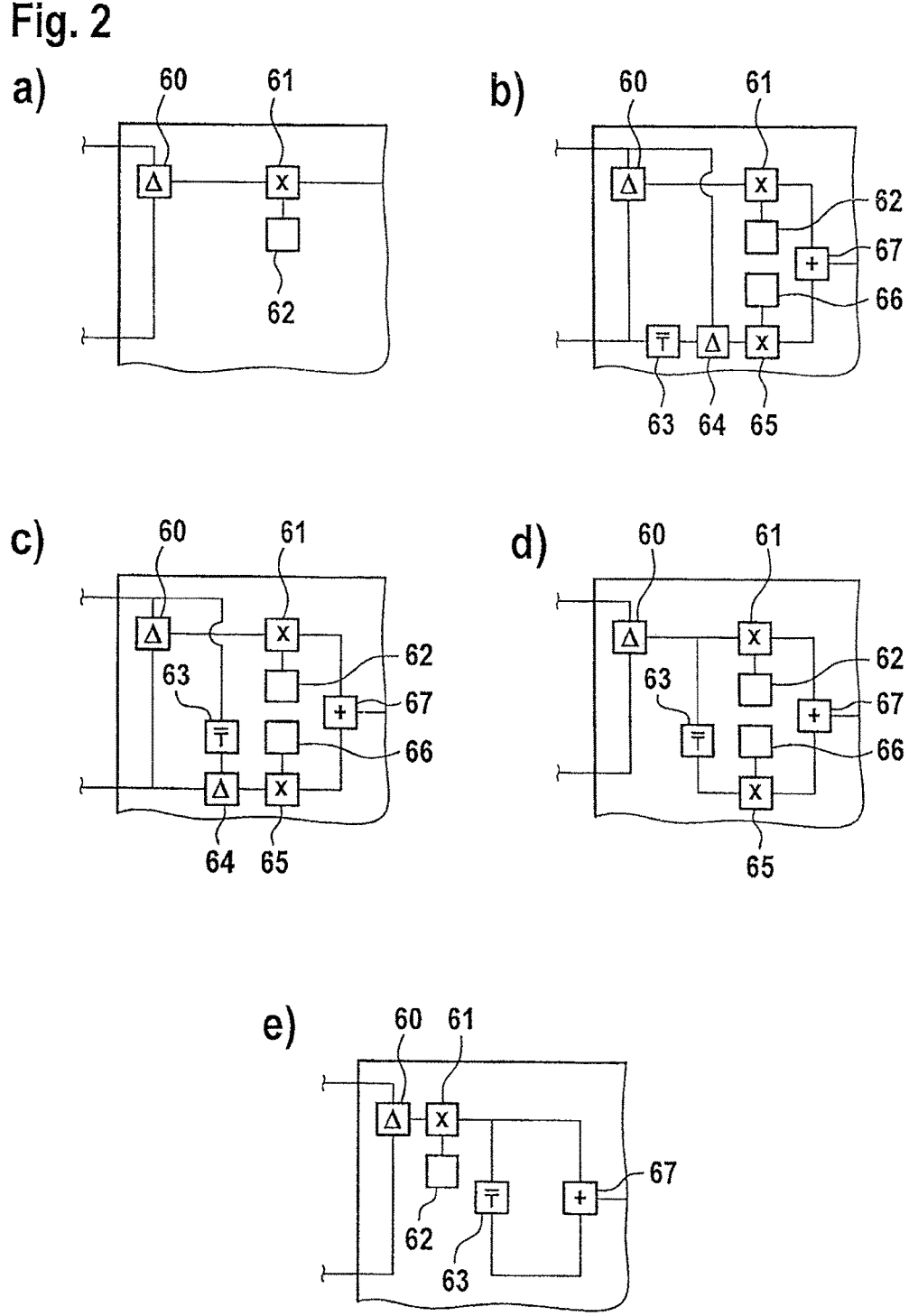
FIGS. 2a-e: Partial representations of a control unit for wind energy installations.

In FIG. 2a, in the control unit 17, a difference module 60 forms the difference from the input values comprising the target voltage value Utarget and the actual voltage Uactual, which a multiplication module 61 then multiplies by a factor kIb that is stored in a storage module 62. After the multiplication is performed, the factor Ib1 exists, which is equal to the overall factor Ib as an output value.

Like the control unit 17 according to FIG. 2a, the control unit 17 according to FIG. 2b includes a difference module 60, which forms the difference from the input values comprising the target voltage value Utarget and the actual voltage Uactual, and a multiplication module 61 that is arranged after it for multiplying the output of the difference module 60 by a factor kIb that is stored in a storage module 62. After this multiplication is performed, the factor Ib1 exists. In addition, the control unit 17 also comprises an averaging module 63, with which a time average of an input value can be formed. In the illustrated embodiment, the averaging module 63 is used to average the actual voltage Uactual to a value Uactual; averaged over time. Another difference module 64 then forms the difference between the target voltage value Utarget and the averaged actual voltage Uactual; averaged, which another multiplication module 65 then multiplies by a factor kIb2 that is stored in a storage module 66. The result is thus the factor Ib2. The addition module 67 then adds the factors Ib1 and Ib2 to form the overall factor Ib.

A control unit 17 configured according to FIG. 2b offers the advantage that in the event of a network fault or a similar event, a portion of the generated reactive power continues to be adjusted to the new situation instantaneously (via the factor Ib1), while another portion is adjusted with a certain delay (via the factor Ib2). In this way, it is possible to avoid unnecessary oscillation excitement in the internal wind farm network and/or power supply network.

Alternatively, in order to determine the factor Ib2, it is possible to average the target voltage value Utarget to a value Utarget; averaged over time. FIG. 2c shows a correspondingly configured control unit 17. In the embodiment according to FIG. 2c, which is otherwise identical to FIG. 2a, the averaging module 63 is used for forming the value Utarget; averaged.

Alternatively, in order to determine the factor Ib2, it is possible to average the difference between the target voltage value Utarget and the actual voltage Uactual over time, before it is multiplied by the factor kIb2 via the multiplication module 65 to form the factor Ib2. FIG. 2d shows a correspondingly configured control unit.

Alternatively, it is possible for the factor Ib2 to represent the factor Ib1 averaged over time. FIG. 2e shows a correspondingly configured control unit 17. The averaging module 63 averages the factor Ib1 over time to form the factor Ib2. The factors Ib1 and Ib2 are then added via the addition module 67 to form the overall factor Ib.

The factors kIb1 and kIb2 can be prespecified and stored in storage modules 62, 66 in the control unit 17. However, it is also possible for the farm master to determine these factors kIb1 and kIb2 and transmit them to the wind energy installations. Since these factors are not values that must be calculated in real time (as are, for example, the reactive power target values in prior art), the farm master does not have to have extraordinarily high computing power.

The factors kIb1 and kIb2 can be determined separately for each wind energy installation. It is also possible to combine a plurality of wind energy installations into one or a plurality of groups and to determine the factors kIb1 and kIb2 for the wind energy installations in this group. The wind energy installations in a group then operate using identical factors kIb1 and kIb2. It is preferred if the factors kIb1 and kIb2 are composed of global factors kIb1; global and kIb2; global, as well as individual factors kIb1; WEI and kIb2; WEI, for each wind energy installation or group of wind energy installations. However, it is also possible for all wind energy installations on the wind farm to be operated using the same factors kIb1 and kIb2.

Alternatively or additionally, the control unit 17 can individually adjust the target voltage value Utarget that is received by the farm master 50 as an input value via a value deltaUtarget; WEI. The value deltaUtarget; WEI can, for example, be added to the received target voltage value Utarget.

Alternatively, it can be provided that a mixed controller is used by causing the farm master 50 to transmit an absolute or relative reactive power target value to the control units 17 of the wind energy installations 10, in addition to the target voltage value Utarget. The control units 17 of the wind energy installations 10 can then determine a reactive current by means of the reactive power target value that is additionally modified using the deviation of the actual voltage from the target voltage value Utarget multiplied by a factor kIb1. It is then a mixed reactive power-voltage control.

The invention claimed is:

1. A method for operating a wind farm having a plurality of wind energy installations, each wind energy installation having a control unit that is connected to an internal wind farm network, a substation at which electrical power that is generated on the wind farm is delivered by the internal wind farm network to a power supply network, and a farm master that is connected to the control unit of each wind energy installation of the plurality of wind energy installations, the method comprising:

determining, by the farm master, a uniform target voltage value, transmitting, by the farm master, the uniform target voltage value to the control unit of each wind energy installation of the plurality of wind energy installations, determining, by a control unit of a wind energy installation of the plurality of wind energy installations, an overall factor for setting the reactive power generated by the wind energy installation, and setting, by the control unit of the wind energy installation of the plurality of wind energy installations, the reactive power generated by the wind energy installation according to the overall factor to reduce reactive power losses in the internal wind farm network, wherein the overall factor comprises a first factor that is calculated from a difference between an actual voltage present at the wind energy installation and the uniform target voltage value, multiplied by a gain factor, wherein the gain factor comprises a summation of a global gain factor and an individual gain factor for each wind energy installation.

2. The method of claim 1, wherein the overall factor comprises another factor to be added to the first factor, wherein the another factor is calculated from a difference between the actual voltage present at the wind energy installation averaged over a specified period of time and the target voltage value, multiplied by the gain factor.

3. The method of claim 1, wherein the overall factor comprises another factor to be added to the first factor, wherein the another factor is calculated from the difference averaged over a specified period of time between the actual voltage present at the wind energy installation and the target voltage value, multiplied by the gain factor.

4. The method of claim 1, wherein the overall factor comprises another factor to be added to the first factor, wherein the another factor is calculated from the difference between the actual voltage present at the wind energy installation and the target voltage value averaged over a specified period of time, multiplied by the gain factor.

5. The method of claim 1, wherein one or both of the global gain factor and the individual gain factors is determined by the farm master and is transmitted to the control units of the plurality of wind energy installations.

6. The method of claim 1, wherein an individual target voltage correction factor is provided for each of the plurality of wind energy installations and the difference between the actual voltage present at the wind energy installation and the target voltage value is reduced by the individual target voltage correction factor provided for the wind energy installation.

7. The method of claim 6, wherein the individual target voltage correction factors are determined by the farm master and transmitted to the control unit of each wind energy installation of the plurality of wind energy installations.

8. The method of claim 6, wherein the gain factor comprises a global gain factor and an individual gain factor provided for each of the plurality of wind energy installations, wherein at least two wind energy installations of the plurality of wind energy installations are combined into a group, and wherein one or both of the individual gain factor and the individual target voltage correction factor are shared by the group.

9. A wind farm comprising:
a plurality of wind energy installations, each wind energy installation having a control unit, which are connected to an internal wind farm network,
a substation at which electrical power that is generated on the wind farm is delivered by the internal wind farm network to a power supply network, and
a farm master that is connected to the control unit of each wind energy installation of the plurality of wind energy installations,
wherein the farm master is configured to determine a uniform target voltage value and to transmit the uniform target voltage value to the control unit of each wind energy installation of the plurality of wind energy installations, and the control unit of each wind energy installation is configured to:
determine an overall factor for setting reactive power of the respective wind energy installation, wherein the overall factor comprises a first factor that is calculated from a difference between an actual voltage present at the respective wind energy installation and the target voltage value, multiplied by a gain factor, wherein the gain factor comprises a summation of a global gain factor and an individual gain factor for each wind energy installation, and
control reactive power generated by the respective wind energy installation by setting the reactive power generated by the respective wind energy installation according to the overall factor to reduce reactive power losses in the internal wind farm network.

10. The wind farm of claim 9, wherein the overall factor comprises another factor to be added to the first factor, wherein the another factor is calculated from a difference between the actual voltage present at the wind energy installation averaged over a specified period of time and the target voltage value, multiplied by the gain factor.

11. The wind farm of claim 9, wherein the overall factor comprises another factor to be added to the first factor, wherein the another factor is calculated from the difference averaged over a specified period of time between the actual voltage present at the wind energy installation and the target voltage value, multiplied by the gain factor.

12. The wind farm of claim 9, wherein the overall factor comprises another factor to be added to the first factor, wherein the another factor is calculated from the difference between the actual voltage present at the wind energy installation and the target voltage value averaged over a specified period of time, multiplied by the gain factor.

13. The wind farm of claim 9, wherein one or both of the global gain factor and the individual gain factors are determined by the farm master and transmitted to the control unit of each wind energy installation of the plurality of wind energy installations.

14. The wind farm of claim 9, wherein an individual target voltage correction factor is provided for each of the plurality of wind energy installations and the difference between the actual voltage present at the wind energy installation and the target voltage value is reduced via an individual target voltage correction factor provided for the wind energy installation.

15. The wind farm of claim 14, wherein the individual target voltage correction factors are determined by the farm master and transmitted to the control unit of each wind energy installation of the plurality of wind energy installations.

16. The wind farm of claim 14, wherein the gain factor comprises a global gain factor and an individual gain factor provided for each of the plurality of wind energy installations, wherein at least two wind energy installations of the plurality of wind energy installations are combined into a group, and wherein one or both of the individual gain factor and the individual target voltage correction factor are shared by the group.

* * * * *